Oct. 3, 1944.   J. TURENCHALK ET AL   2,359,594
COLLET AND ROD GRINDER
Filed Aug. 30, 1943
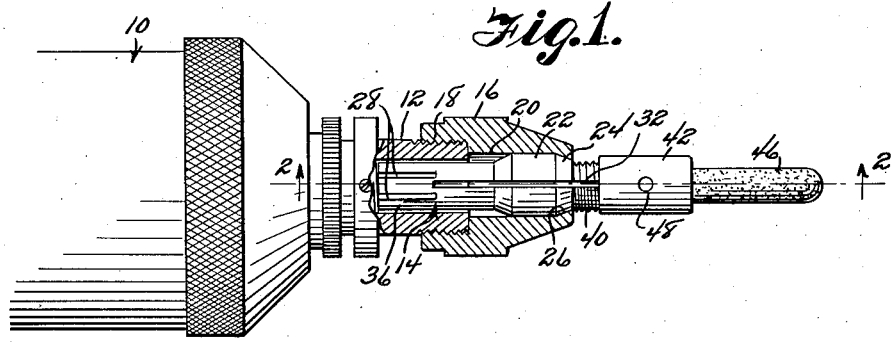
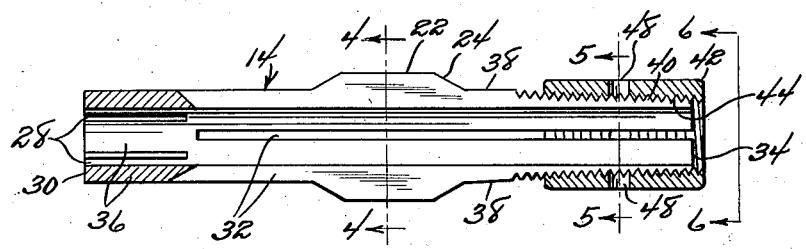
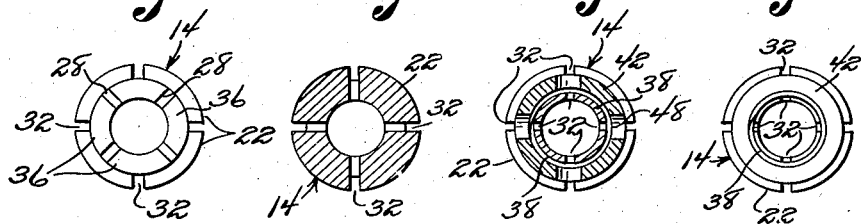
John Turenchalk
Harry Turenchalk INVENTORS
BY
Victor J. Evans & Co.
ATTORNEYS Patented Oct. 3, 1944

2,359,594

UNITED STATES PATENT OFFICE 2,359,594

COLLET AND ROD GRINDER

John Turenchalk and Harry Turenchalk, Yonkers, N. Y.

Application August 30, 1943, Serial No. 500,565

9 Claims. (Cl. 51—166)

Our invention relates to power operated grinding devices, and has among its objects and advantages the provision of an improved rod grinder mount for stones employed in grinding, drilling, polishing, etc.

Present day stone grinders usually comprise stone heads of various sizes and shapes which are affixed to a metal shaft, the shaft being held in a collet which is driven by a portable rotary tool operated by an electric motor. Such stone heads, because of their small sizes and type of mount, are easily broken. The stones also wear out in a short time.

Accordingly an object of my invention is to provide a novel collet designed to effectively support rod grinder stones, wherein the construction is such as to handle relatively long stones to increase the wearing life of the stones, and in which the collet is capable of supporting short remains of the stones in true concentricity with the axis of the collet.

A further object is to provide a rod stone and collet combination wherein the stone itself may have a length at least equalling that of a conventional stone head and its attached shaft to greatly increase the wearing life of the stone, and in which novel means are provided for imparting radial expansion to the collet to frictionally secure the collet in the tool shaft when the stone has worn down to a relatively short piece.

Another object is to provide a collet for supporting a rod stone which may be adjusted axially of the collet to compensate for wear, and in which the collet is of such construction as to effectively hold the stone in true concentricity with its axis regardless of the length of the stone.

A further object is to provide a collet for stones of cylindrical contour wherein the stone may be adjusted axially of the collet to compensate for wear, and in which the collet is of such construction as to expand radially at one end to maintain good frictional connection with its rotary drive shaft as the other end of the collet is contracted upon the stone when worn to a relatively short length.

In the accompanying drawing:

Figure 1 is a partial sectional view of the invention in association with a conventional power operated tool.

Figure 2 is a longitudinal sectional view of the collet taken along the line 2—2 of Figure 1.

Fig. 3 is an end view of the collet.

Figure 4 is a sectional view along the line 4—4 of Figure 2.

Figure 5 is a sectional view along the line 5—5 of Figure 2, and

Figure 6 is a view taken from the position indicated by line 6—6 of Figure 2.

In the embodiment of the invention selected for illustration, Figure 1 illustrates the nose end of a conventional tool 10 of the portable type, which tool is provided with a drive shaft 12 of tubular contour for the reception of one end of a collet 14. This shaft is threaded for connection with a head nut 16, as at 18. The head nut 16 includes a bore 20 of such diameter as to receive the cylindrical body 22 of the collet. This body is provided with a tapered end face 24 having camming engagement with a correspondingly shaped end face 26 in the nut 16 to press the collet upon a tool spindle or other device to be operated by the tool. Such tools include a small electric motor for driving the shaft 12.

The collet 14 is provided with four slots 28 extending longitudinally thereof and intersecting its inner end 30. These slots are equally spaced one from the other. The collet is also provided with second slots 32 arranged longitudinally of the collet and intersecting its opposite end 34. These slots comprise four in number and are equally spaced one from the other but are offset 45 degrees from the slots 28. The slots 32 are of considerable length, extending throughout the greater length of the collet 14 and terminating in a plane transversely of the axis of the collet slightly short of the similar plane of the slots 28. Thus the collet 14 includes four short fingers 36 and four long fingers 38. The fingers 38 may be constricted upon tools inserted in the collet through rotation of the head nut 16 to bring the face 26 into camming engagement with the face 24.

Conventional collets have a length usually terminating at the outer end of the face 24. In the instant case, the collet is of greater length, and the fingers 38 are provided with tapered external threads 40 for threaded connection with a collar 42 having tapered internal threads 44 for coaction with the threads 40 to press the fingers 38 upon the work.

In Figure 1, a grinding stone 46 is mounted in the collet 14, which grinding stone is of cylindrical contour. This stone has an original length exceeding that of the collet 14, with the stone originally adjusted as to project whatever operating length is required. Such a stone is characterized by a long wearing life and the stone may be adjusted axially of the collet from time to time to compensate for wear. When the stone 46 is of considerable length, the stone may be effectively secured in the collet through tightening of the head nut 16.

When the stone 46 becomes worn to a short length, the stone is effectively supported in the collet by reason of the collar 42. This collar is provided with openings 48 for coaction with a spanner wrench, through the medium of which the collar may be tightened on the threaded fingers 38. Upon tightening of the collar 42, particularly when the stone 46 is of a short length, the fingers 38 are pressed firmly upon the stone 46, while the fingers 36 are caused to expand into firm frictional engagement with the shaft 12. Such relative movement of the fingers 36 and 38 is permitted by reason of the arrangement of the slots 28 and 32, this arrangement being such that the unslotted material in the zone of the collet adjacent the two sets of slots functions as a fulcrum which flexes to permit radial expansion of the end 30 of the collet as the end 34 is contracted upon the stone.

In addition to securing firm anchorage for relative short stones, the radial expansion of the collet and the stone gripping action of the fingers 38 are such as to maintain true concentricity of the stone with respect to the axis of the collet.

The stones 46 may be made up in different diameters, and the collet 14 may also be made in different sizes to accommodate stones of different diameters. This type of stone eliminates the combination stone heads and spindles such as are used at the present time. Conventional stones wear down in a relatively short period of time, and the heads are weakened by reason of their connection with the spindle. In the present case, the stone 46 is of such original length as to provide a grinding element which will outwear many grinders of the head and spindle type. In addition, the stone is unimpaired by spindle attaching formations and devices.

Without further elaboration, the foregoing will so fully explain our invention, that others may, by applying current knowledge, readily adapt the same for use under various conditions of service.

We claim:

1. In combination with a power driven element having a bore, a collet having an end receivable in said bore, a cylindrical stone receivable in said collet, said collet having first fingers fitting in said bore and second fingers fitting over said stone, and means for pressing said second fingers upon the stone and radially expanding the first fingers against the face of said bore.

2. In combination with a power driven element having an opening, a work supporting collet, said collet having first fingers receivable in said opening and second fingers to extend over the work, and means for flexing the collet to radially expand the first fingers against the face of said opening and to press the second fingers upon the tool.

3. In a tool of the type described having a power driven element of socket like contour, a collet comprising a tubular member slotted inwardly of one end to provide first fingers receivable in said socket like element, said collet being slotted inwardly from its other end to provide second work gripping fingers, the slots in the respective ends of the collet terminating in a manner providing an unslotted annular body comprising a fulcrum for the first and second fingers, and means for clamping the second fingers upon work positioned therebetween and to impart radial expansion to the first fingers through flexing of the collet in the zone of said fulcrum.

4. In combination with a power driven element having a bore, a collet having an end receivable in said bore, a cylindrical stone receivable in said collet, said collet having first fingers fitting in said bore and second fingers fitting over said stone, and means for pressing said second fingers upon the stone and radially expanding the first fingers against the face of said bore, said means comprising a tapered formation on said collet and a second tapered formation engaging the first tapered formation to press the first fingers upon the stone through relative movement of the tapered faces.

5. In a tool of the type described having a power driven element of socket like contour, a collet comprising a tubular member slotted inwardly of one end to provide first fingers receivable in said socket like element, said collet being slotted inwardly from its other end to provide second work gripping fingers, the slots in the respective ends of the collet terminating in a manner providing an unslotted annular body comprising a fulcrum for the first and second fingers, and means for clamping the second fingers upon work positioned therebetween and to impart radial expansion to the first fingers through flexing of the collet in the zone of said fulcrum, said means comprising a head nut threadedly connected with said element and coacting cam faces on the head nut and the collet.

6. The invention described in claim 1 wherein said first fingers are offset with respect to the second fingers circumferentially of the collet.

7. A collet of the type described comprising a sleeve like body slotted inwardly of each end to provide first and second fingers, said body being unslotted throughout a short length between the two sets of slots to provide a fulcrum about which the divided parts of the collar may pivot.

8. In combination with a power driven element having a socket, a collet having an end receivable in said socket, cam faces on said collet, a head nut threadedly connected with said element and having a cam face engageable with said first cam faces to press the collet upon a tool inserted therein, said collet having an extension beyond said cam faces, said extension having tapered threads, and a collar having tapered threads coacting with said first mentioned tapered threads to press the collet upon the tool.

9. In combination with a power driven element having a bore, a collet having an end receivable in said bore, a stone receivable in said collet, said collet having relatively stiff, short fingers fitting in said bore and second relatively long, more flexible fingers fitting over said stone, means for pressing said second fingers upon the stone and radially expanding the first fingers against the face of a said bore, including tapered exterior threads on said second more flexible fingers, and a collar having tapered internal thread coacting with said external threads to constrict the second fingers upon said stone.

JOHN TURENCHALK.
HARRY TURENCHALK.